United States Patent [19]
Fan

[11] Patent Number: 5,864,460
[45] Date of Patent: Jan. 26, 1999

[54] RENOVATED STRUCTURE OF MULTI-SLOTTED IRON ROD

[76] Inventor: Yun-Kuang Fan, No. 36 Kuo Hsing St., Tao Yuan, Taiwan

[21] Appl. No.: 667,905

[22] Filed: Jun. 20, 1996

[51] Int. Cl.$^6$ ...................................................... H01G 4/38
[52] U.S. Cl. .............................. 361/328; 333/185; 336/69
[58] Field of Search ..................................... 361/328, 309,
361/299.1, 303, 314, 321.6, 763, 302, 308.3;
333/185, 181, 175, 168, 167; 336/6 G,
84 C, 84 M, 82, 84 R, 200

[56] References Cited

U.S. PATENT DOCUMENTS 3,638,155  1/1972  Combs ....................................... 336/69

Primary Examiner—Kristine L. Kincaid
Assistant Examiner—Anthony Dinkins
Attorney, Agent, or Firm—Pro-Techtor International Services

[57] ABSTRACT

An improved structure of a multi-slotted iron rod includes a core, a coil, and a lead frame. The core is a rod is made from good magnetic iron powder. The core has a fixture area and a winding area. The winding area has several winding sections and isolation sections. The winding area is used for coil winding. The isolation sections serve as capacitors. The fixture area has a hexagonal cross section and is used as a fixing end during winding. The coil winds on the winding sections of the core. The lead frame is attached to the two sides of the isolation sections of the core for connection to an electrical circuit. The device utilizes the above components to wind the coil on the winding sections of the core. The output pin of the coil is soldered to the lead frame of the isolation sections. The lead frame is soldered on the PC board. The capacitor of the isolation section of the core is connected in parallel to the coil in the winding section. The lead frame is soldered directly to the PC board or is mounted by Surface Mounting Technology (SMT) to the PC board. The device functions as capacitor and inductor at the same time.

5 Claims, 4 Drawing Sheets

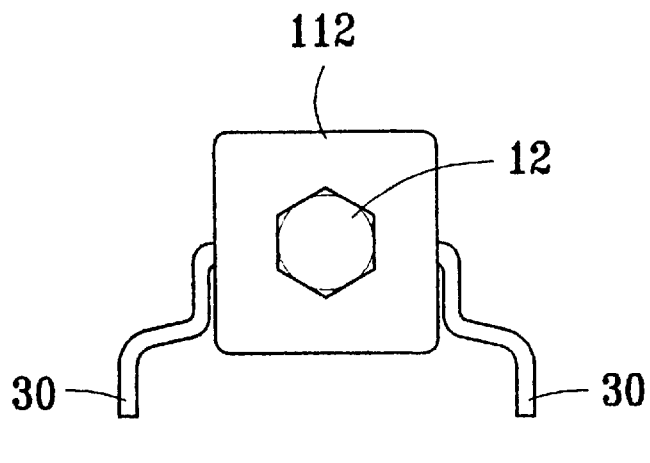
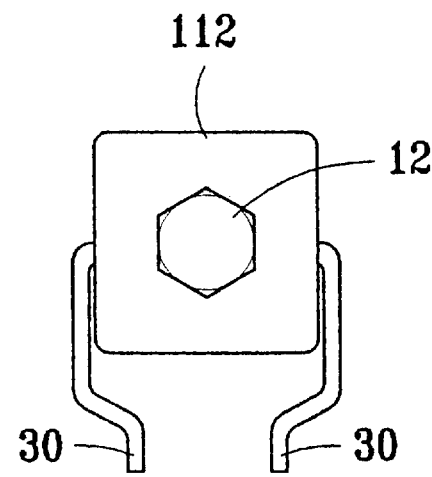
FIG. 5B    FIG. 5C
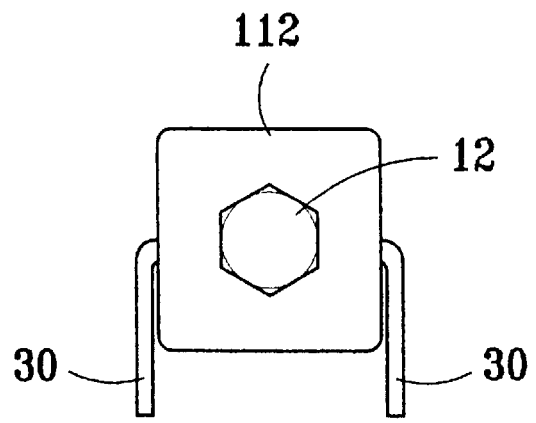
FIG. 5A
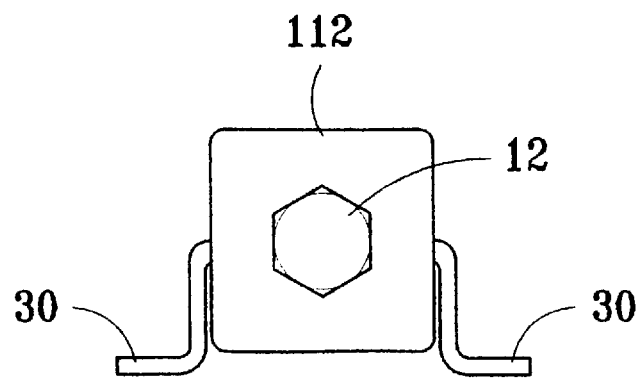
FIG. 6

RENOVATED STRUCTURE OF MULTI-SLOTTED IRON ROD

BACKGROUND OF THE INVENTION

1. Field of the Invention

The present invention provides an improved structure for a multi-slotted iron rod which is convenient for winding, easy to solder, increases daily capacity, and also combines the functions of capacitor and inductor in one multi-slotted iron rod.

2. Description of the Prior Art

The inductor is usually used in electronic devices as a filter. The conventional inductor of a multi-slotted iron rod winds the coil on the core, and then the coil is soldered to the PC board directly. As the core is very slippery during winding, large errors in the coil numbers can result, leading to inaccuracy of induction. Moreover, the soldering is always done by a human. If the solderer is not skilled enough, it is very easy to have defective soldering.

After soldering, epoxy is used to seal the inductor inside the case. During epoxying, the temperature of the inductor is reduced from 100° C. to room temperature. As the wire of the coil is very fine, it expands significantly when it is heated and contracts during the cooling. It is therefore very easy to break the wire of the coil.

Space on the PC board is very limited, which makes the soldering more difficult. The working speed of the solderer is very slow.

Moreover, conventional function only as filters. The capacitors and inductors need to be added to the PC board. This wastes space on the PC board.

SUMMARY OF THE INVENTION

The present invention relates to an improved structure of a multi-slotted iron rod. The device comprises a core, a coil, and a lead frame. The core is a rod is made from good magnetic iron powder. The core has a fixture area and a winding area. The winding area has several winding sections and isolation sections. The winding area is used for coil winding. The isolation sections serve as capacitors. The fixture area has a hexagonal cross section and is used as a fixing end during winding. The coil winds on the winding sections of the core. The lead frame is attached to the two sides of the isolation sections of the core for connection to an electrical circuit.

The present invention utilizes the above components to wind the coil on the winding sections of the core. The output pin of the coil is soldered to the lead frame of the isolation sections. The lead frame is soldered on the PC board. The capacitor of the isolation section of the core is connected in parallel to the coil in the winding section. The lead frame is soldered directly to the PC board or is mounted by Surface Mounting Technology (SMT) to the PC board. The present invention functions as capacitor and inductor at the same time.

BRIEF DESCRIPTION OF THE DRAWINGS

The invention, as well as its many advantages, may be further understood by the following detailed description and drawings in which:

FIGS. 5a–c are left side views of the core of the present invention;

FIG. 6 is the left side view of the core using SMT to attach the lead frame.

DETAILED DESCRIPTION OF THE PREFERRED EMBODIMENT

Figure 1:
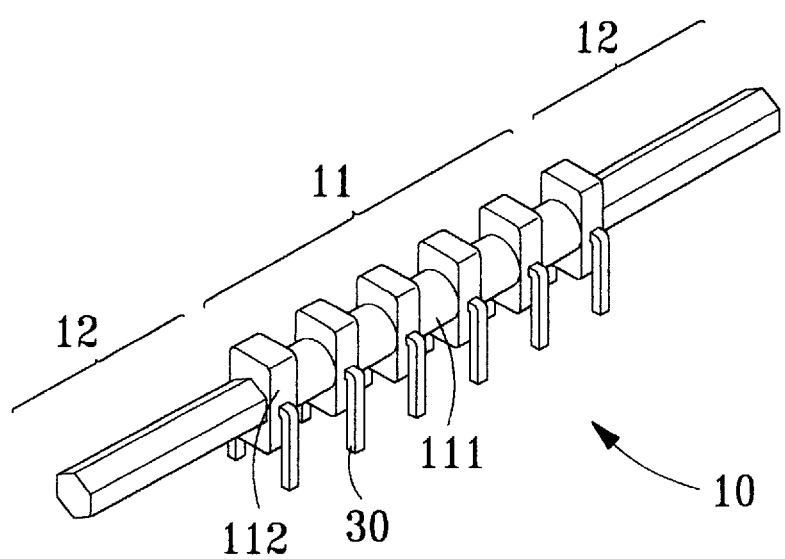
FIG. 1 is a perspective view of the core of the present invention.
Figure 2:
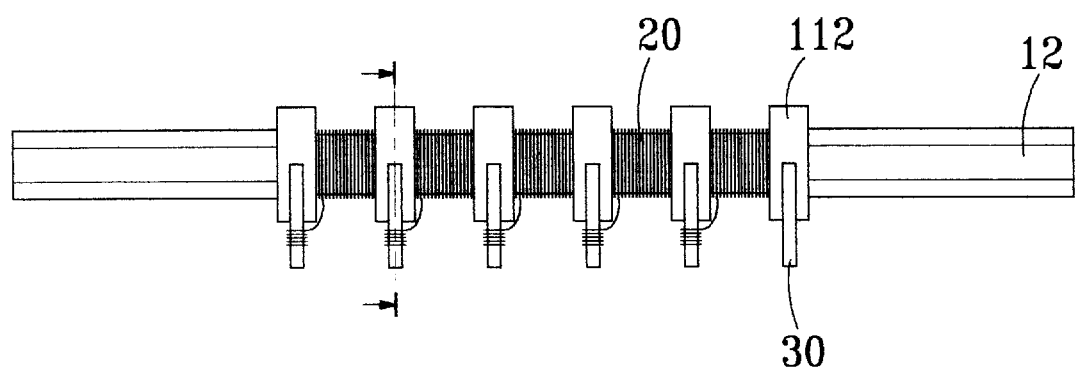
FIG. 2 is a front view of the small rod inductor of the present invention.
Figure 4:
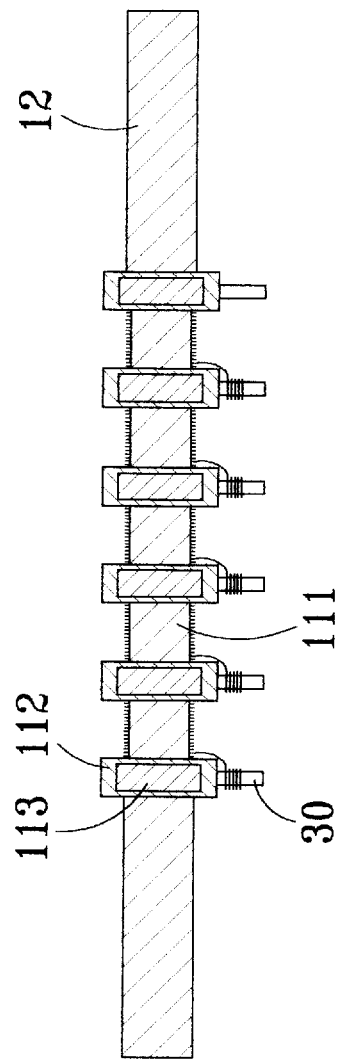
FIG. 4 is a section view of the small rod inductor of the present invention.
Figure 3:
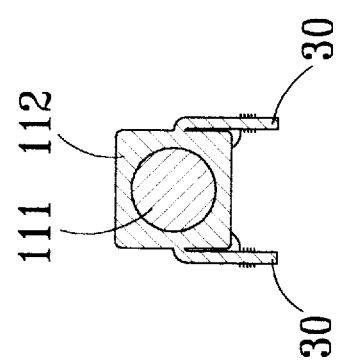
FIG. 3 is a section view of the core of the present invention.

As shown in FIGS. 1 to 6, the improved structure of a multi-slotted iron rod of the present invention comprises a core 10, a coil 20, and a lead frame 30.

This core 10 is a long rod which is made from iron powder with good magnetic properties. The core 10 includes a winding area 11 and a fixture area 12. On the winding area 11 are several winding sections 111 and several isolation sections 112. The winding sections are used for coil winding and the isolation sections comprise a capacitor 113. The fixture area 12 is hexagonal in cross section and is used as a fixing end during winding.

The coil 20 is wound on the winding sections 111 of the core 10. The lead frame 30 is attached to the two sides of the isolation sections 112 of the core, and serve as electrical connectors.

The present invention utilizes the above components to wind the coil 20 on the winding sections 111 of the core 10. The output pin of coil 20 is soldered to the lead frame 30 of the isolation section 112. The lead frame 30 is soldered to the PC board. The capacitor 113 in the isolation section 112 of the core 10 is connected in parallel to the coil 20 in the winding section 111. The lead frame 30 can be directly soldered to the PC board as shown in FIGS. 5a–c. The pin of lead frame 30 of the present invention can be straight or bent, and can use SMT to be mounted on the PC board. The pin shape used when the present invention adopts SMT is shown in FIG. 6. Using the above technique, the present invention functions as capacitor and inductor at the same time.

Besides keeping the coil from slipping during winding and thereby having an accurate number of turns, the present invention includes a capacitor inside the core of the inductor. This makes the size of the filter smaller and reduces the space requirements on the PC board.

Many changes and modifications in the above described embodiment of the invention can, of course, be carried out without departing from the scope thereof. Accordingly, to promote progress in science and the useful arts, the invention is disclosed and is intended to be limited only by the scope of the appended claims.

What is claimed is:

1. An improved structure of a multi-slotted iron rod comprising:

a core, a coil, and at least one lead frame, said core comprises an elongated rod with magnetic properties, said core includes a winding area and a fixture area, said winding area includes a plurality of winding sections and a plurality of isolation sections, said winding sections are adapted to be used for coil winding and said isolation sections provide capacitance to said multi-slotted iron rod, said fixture area has a hexagonal cross section, said fixture area is adapted to be used as a fixing end during winding, said coil is wound on said winding sections of said core, said at least one lead frame is attached to sides of one of said isolation sections of said core, said at least one lead frame is adapted to serve as an electrical connector; such that said multi-slotted iron rod functions as a capacitor and an inductor at the same time.

2. The multi-slotted iron rod as claimed in claim 1 wherein:

said capacitor is connected in parallel to said coil.

3. The multi-slotted iron rod as claimed in claim 1 wherein:

said core is formed from iron powder with magnetic properties.

4. The multi-slotted iron rod as claimed in claim 1 wherein:

said at least one lead frame is mounted by soldering.

5. The multi-slotted iron rod as claimed in claim 1 wherein:

said at least one lead frame is mounted by surface mounting technology.

* * * * *